Oct. 4, 1955 F. O. V. LARSEN 2,719,671

ELECTRICAL CALCULATING SYSTEMS

Filed Feb. 15, 1951 3 Sheets-Sheet 1

INVENTOR

F. O. V. Larsen

BY Watson, Cole, Grindle & Watson

ATTORNEY

INVENTOR
F. O. V. Larsen
BY Watson, Cole, Grindle & Watson
ATTORNEY

INVENTOR
F. O. V. Larsen
BY Watson, Cole, Grindle & Watson
ATTORNEY

United States Patent Office 2,719,671

Patented Oct. 4, 1955

2,719,671

ELECTRICAL CALCULATING SYSTEMS

Fridthiof Oscar Valdemar Larsen, Gentofte, near Copenhagen, Denmark, assignor to Aktiebolaget Duba, Stockholm, Sweden, a joint-stock company of Sweden Application February 15, 1951, Serial No. 211,134

8 Claims. (Cl. 235—61)

The present invention relates to electrical calculating systems having an operating device and a calculating equipment comprising an input register set an accumulator register and a multiplier register hereinafter in common referred to by the term calculating sets, each set comprising a number of individual registering units arranged each to be set to any one of various positions corresponding to the number of unit-digits of the decimal system. Each registering unit in a calculating set is adapted to register digits of a certain decade of the decimal system and the number of registering units in each calculating set is equal to the number of decades, inclusively the decimal decade, in the largest number which it is desirable to register in a calculating set in question. The number of registering units of the input-register is of a corresponding order of size. The setting of the registering unit of the input-register-group is controlled by means of key contacts, corresponding in number to the number of digit values and multipled to the registering unit of the input-register group.

One object of the invention is to devise a calculating system of the kind referred to which may be used in simple manner not only for carrying out substraction, addition and multiplication of integral numbers, but also for carrying out all such calculating operations with numbers including decimal fractions.

The systems so far known by means of which multiplications may be carried out with the decimal point in the product require long time of practice and great care on the part of the operator.

In a system according to the invention, the decimal point is automatically placed in the proper position in the computed product, and all the operator has to do to obtain this, is to operate a particular key, the decimal point key, when arriving at the position of the decimal point in striking the digits of the number in question in the conventional succession.

Figure 1:
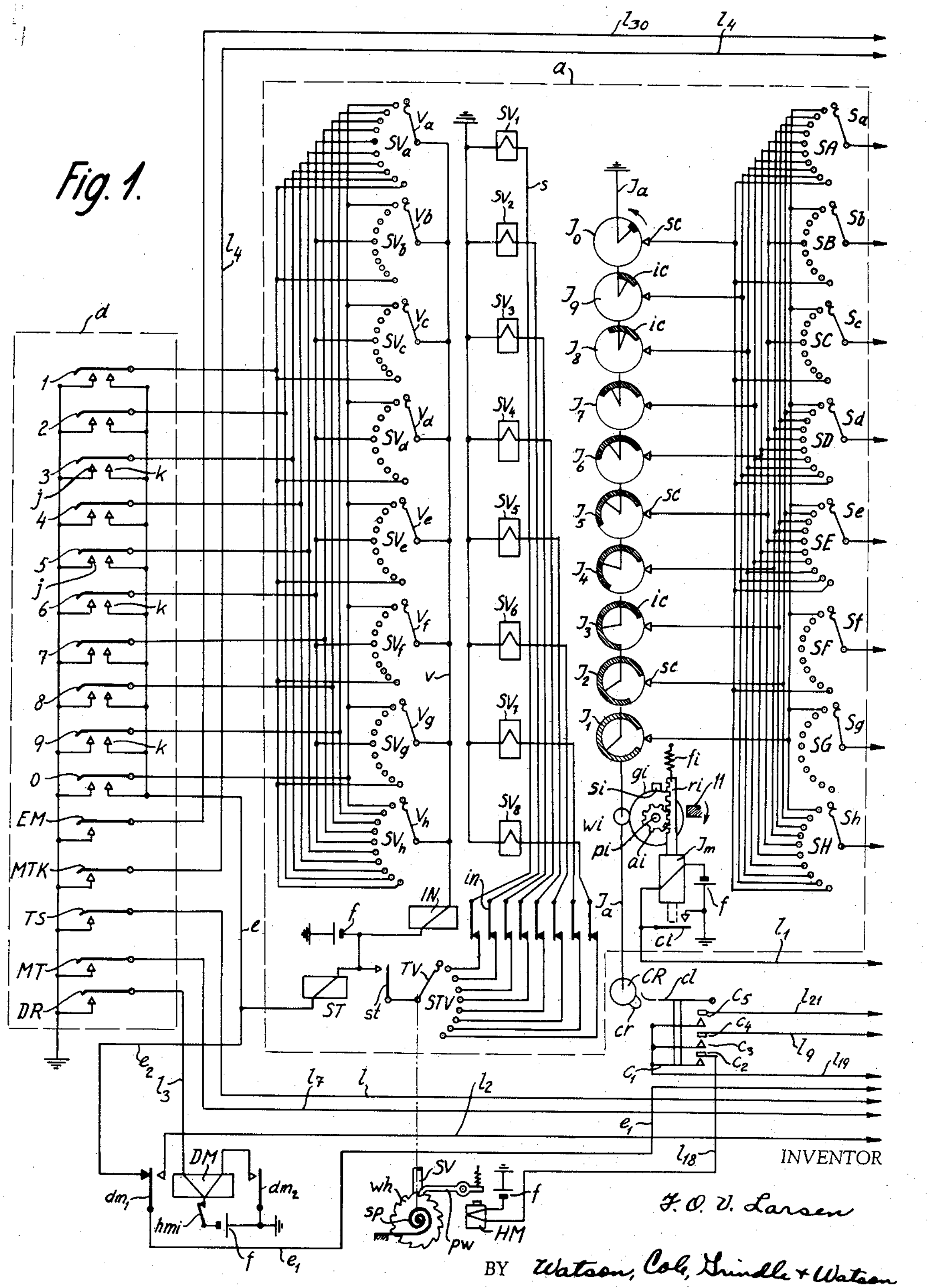
Figure 2:
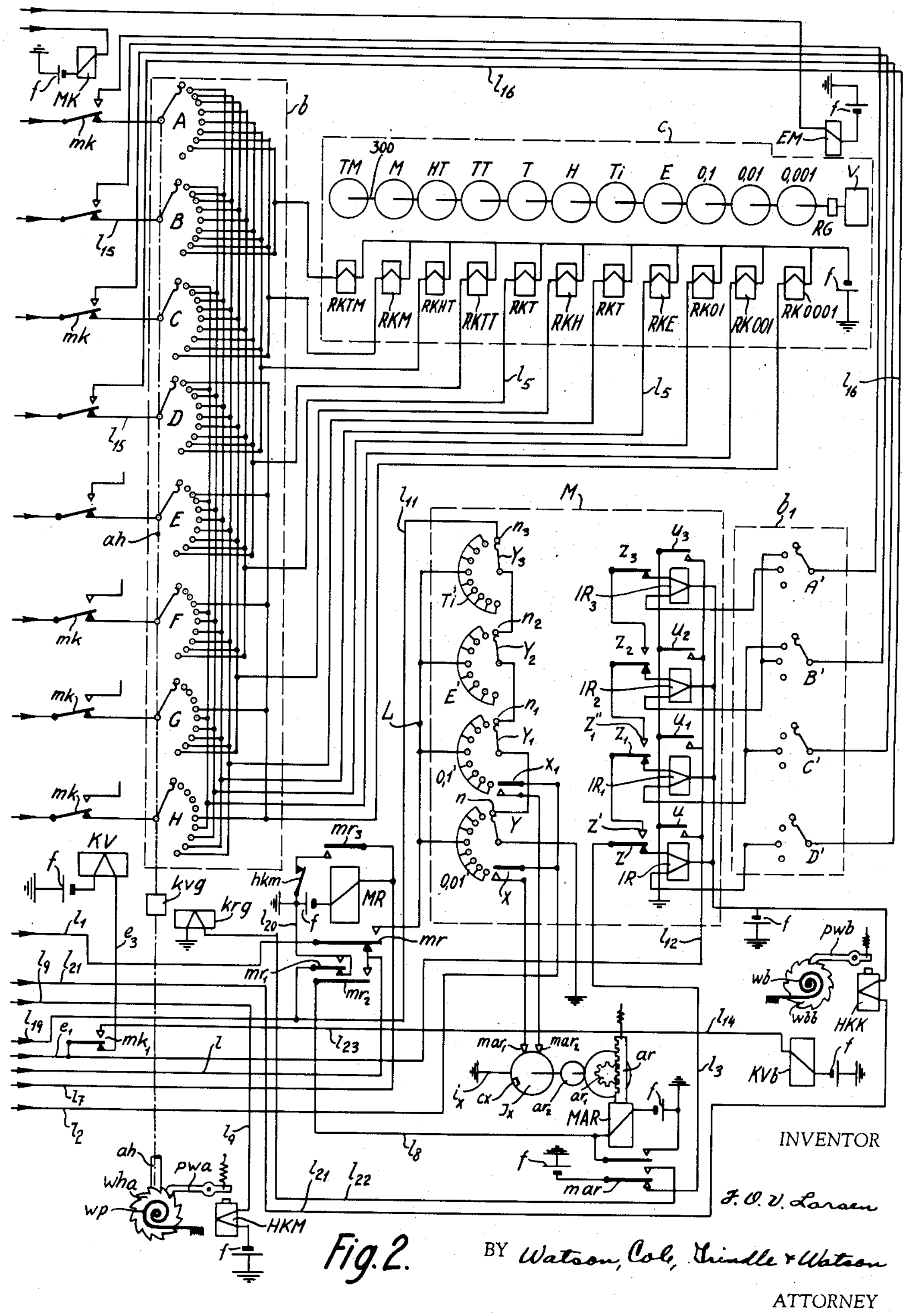
Figure 3:
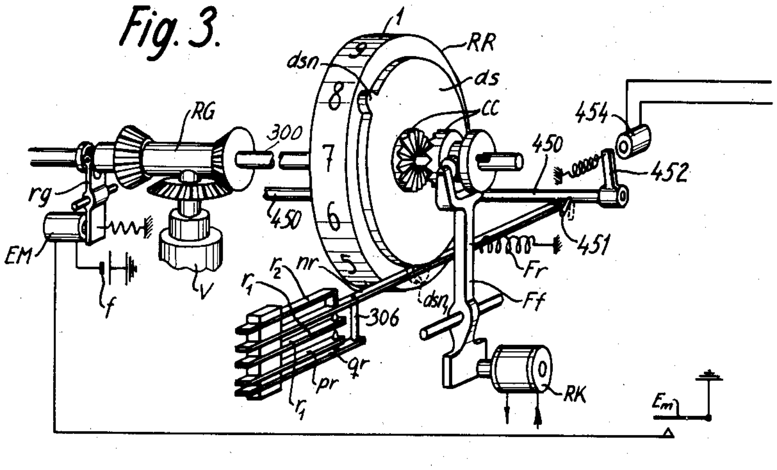

Further objects and advantages of my invention will appear from the following description of the embodiment of a calculating system represented on the accompanying drawings in which:

Figs. 1 and 2 are a circuit diagram of a calculating system according to the invention, Fig. 3 a perspective view of a registering unit.

The calculating system illustrated in Figs. 1–2 in the drawing comprises in the main an operating apparatus *d*, an input-register *a* in which the numbers to be handled are first registered, and an accumulator register *c* in which the results of calculations such as additions, subtractions and multiplications are recorded. Further the apparatus comprises a multiplier register M, hereinafter referred to as the multiplication group.

The register *a* comprises a number of registering units SV*a*—SA, SB*b*—SB . . . SV*h*—SH corresponding to the maximum number of digits of the largest number to be registered in the register. The register units are shown as being selectors in the constructional form of rotary selector switches. In Fig. 1 only eight such registering units are shown, but their number may be greater or smaller according to circumstances. Each of the registering units of the register *a* is adapted to be set in a plurality of various positions corresponding to the number of different digit values 0–9 in the decimal system, and preferably also in a further position, viz. a home position. The construction of these switches has no bearing on the invention as such, but for the sake of simplicity these selectors as stated above, and also other selectors to be mentioned in the following, are assumed to be in the constructional form of rotary switches having contact banks and wipers cooperating therewith. This construction of the selectors is not necessary for carrying out the invention, as the selector may be of any other suitable construction such as relay selectors or relay groups. The selector switches of the input-register are to be so arranged that the wipers of each of these selectors is continuously swept over the bank contacts of same as long as the driving or coupling magnet of the selector more especially referred to below is energized. Selectors of this kind are well known in the art. The wipers of the said selectors may be supported by a common continuously rotating axle to which each wiper might be coupled separately by means of an individual electromagnetic coupling controlled by the coupling magnet $SV_1$ . . . $SV_8$ more especially referred to below.

Any number to be handled in the calculating equipment is first to be recorded in the input-register *a*. This is effected by means of a row of digit transmitting members 1, 2 . . . 0 arranged in the operating apparatus *d* at some proper operating place that may be remote from the calculating equipment. There may be provided a plurality of operating apparatus serving to operate one and the same calculating equipment.

The digit transmitting members 1, 2 . . . 0 of the operating apparatus *d* are as appears from Fig. 1 multipled to the bank contacts of all the register switches SV*a* . . . SV*h* of the register, and the movable contact of each of the members 1, 2 . . . 10 co-operates not only with a grounded contact *j* but besides with a separate contact *k*, adapted to connect a conductor *e* to earth when any of the keys are operated, thus causing the stepping relay ST of a selector switch STV to be energized each time any of the keys are operated. The switch STV is in the following to be referred to as the sequence switch and serves to successively complete the energizing circuits of the operating magnets SV, $SV_1$ to $SV_8$ of the register switches SV*a* . . . SV*h* one after the other is a predetermined order by way of the current source *f*, a contact *st* of the relay ST, the wiper of the sequence switch STV and one of the contacts *i*, which when not operated are in their closed positions.

When the digit transmitting members 1 . . . 0, each corresponding to one of the digit values of the decimal system are operated in any order and succession, each of these digit transmitting members will as it appears from Fig. 1 complete a circuit connection from earth to a separate one of the contacts of each of the banks SV*a*, SV*b* . . . SV*h* which contact in each of the said banks corresponds to the digit value in question. At the same time the digit transmitting member operated completes an energizing circuit of the relay ST by way of the conductor *e*, the winding of the relay ST and a current source *f*. As a consequence of this, the stepping relay ST closes a contact *st* in a circuit connection to the wiper of the sequence switch and at the same time causes the sequence switch STV to be advanced by one step. This operation is repeated each time the digit transmitting members 1, 2 . . . 0 is completed. Accordingly the sequence switch STV is advanced one step each time a digit is struck and each time the wiper of the sequence switch is set on a new bank contact a new one of the operating relays $SV_1$, $SV_2$ . . . $SV_8$ of the register switches SV*a*, SV*b* . . . SV*h* is energized and caused to operate the appurtenant register switch, and any register switch operated in this manner will start to find for the individual bank contact of the switch in question, to which the operated digit transmitting members, that caused the sequence switch to start the considered register switch, has been connected. When the wiper V*a*, V*b* . . . V*h* of the register switch in question encounters the said individual contact, a relay IN is energized in a circuit including the key in question, the said individual contact, the wiper in question, the conductor *v* interconnecting all of said wipers and the winding of the relay IN and the current source *f*. The relay IN then opens its contacts *in*, thus interrupting the operating circuits of the relays $SV_1$, $SV_2$ . . . $SV_8$ to stop the operation of the register switch in question. When the operated digit transmitting member is released it interrupts the energizing circuits described of the relays ST and IN, thus causing the relay IN to allow the contacts *in* to return to their closed position and causing the relay ST to allow the contact *st* to open so as to keep the energizing circuit of the coupling magnets $SV_1$ . . .$SV_8$ interrupted until a further operation of one of the digit transmitting members 1, 2 . . . 0 is effected.

If e. g. the digit transmitting member 5 is struck, a connection is thereby established from this digit transmitting member to the 5th or—if a separate home contact is provided in each of the register switches—then to the 6th bank contact of each of the contact banks SV*a* . . . SV*h* of the register, while at the same time the operating circuit of the operating relay ST of the sequence switch STV is completed from earth over the transmitting member 5 and the conductor *e* to the source *f* of current supply. Thereby the contact *st* is closed and the sequence switch STV is advanced by one step from its home position to complete the operating circuit, of the operating relay $SV_1$ of the first switch SV*a* of the register from the current source *f*, the contact *st*, the wiper TV of the sequence switch STV, the bank contact of said switch connected to the conductor *s*, the winding of the relay $SV_1$ connected to said conductor and earth, whereby the wiper V*a* of the switch SV*a* is stepped forward until encountering the bank contact to which the digit transmitting member 5 has been connected. When this occurs, a circuit is completed from earth by way of the digit transmitting member 5, the contact in the contact bank SV*a* connected thereto, the wiper V*a* co-operating therewith, the conductor *v*, the releasing relay IN and the source *f* to earth. Thus, the first switch SV*a* is brought to rest on the bank contact corresponding to the digit value 5.

It was assumed above that the digit transmitting member 5 was struck and that the wiper V*a* was set in accordance with such striking, whereby a pulse transmitter $I_5$ was connected to the wiper S*a*. Assuming now that the same key contact or another digit transmitting member at the operating position *d*, e. g., the key contact corresponding to the digit value 3 is operated, a circuit is completed by way of the digit transmitting member 3, the conductor *e* and the energizing winding of the operating relay ST to close the contact *st* and to advance the sequence switch by a further step to complete the energizing circuit of the relay $SV_2$ adapted to operate the wiper V*b* of the register switch SV*b* which wiper V*b* thereupon hunts for the bank contact of same connected to the digit transmitting member 3. The relay IN is then energized by way of the digit transmitting member 3, switch SV*b*—V*b* and the conductor *v* so as to stop the wiper V*b* in the position corresponding to the digit value 3.

This manner in operating the register is repeated so many times as a digit is struck by means of the digit transmitting members 1, 2 . . . 0, and each time a further register switch is set.

In addition to the contact banks SV*a*, SV*b* . . . the contacts of which are multipled to the digit transmitting members 1 . . . 0 each of the register units has a second contact bank SA, SB . . . SH respectively. The wipers S*a* . . . S*g* on these contact banks are arranged to be moved synchronously with the wipers V*a*, V*b* . . . V*g* respectively of the contact bank SV*a* . . . SV*h*, so that each pair of wipers co-ordinated in this manner is always simultaneously set in definite positions corresponding to the digit value that is struck. Each of the contact banks SA . . . SH has a home contact and a number of bank contacts corresponding to the number of digit values 0 . . . 9, which bank contacts are multipled to a corresponding number of pulse transmitter members $I_0$, $I_1$, $I_2$ . . . $I_9$ as shown in Fig. 1. The construction of these pulse transmitters does not form part of the invention, and any known type of pulse transmitters may be adopted such as the type in which the pulse transmitters when rotated, e. g. through 360° by means of a common shaft I*a* driven by a driving motor or magnet I*m* to be mentioned below, will supply electrical currents of different duration each corresponding to one of the digit values in the decimal system.

In the embodiment shown diagrammatically on the drawing the impulse transmitter comprises a number of circular disc shaped members $I_0$ . . . $I_9$ which are prepared from an insulating material and are mounted on a common shaft I*a* adapted to be rotated by a stepping magnet or relay I*m* and having each on its circumference an electric contact *ic* having different circumferential lengths in the various members $I_0$ . . . $I_9$ so that stationary electric contacts *ic* engaging each the circumference of an individual one of the members $I_0$ . . . $I_9$ during a rotation of same through an angle of 360° will engage the contact *ic* on the appurtenant member $I_0$ . . . $I_9$ in unequal intervals of time on the different impulse transmitting member, thus arranging for the transmission of current impulses of shorter or longer duration depending on the digit recorded from earth through the shaft I*a*, the contacts *ic* conductively connected to said shaft, the contacts *sc*, the bank contacts of the pulse selectors SA . . . SH connected to the contacts *sc* and the wipers S*a* . . . S*h*. The further extension of the circuits of these current pulses is described below. All of the contacts *ic* are conductively connected to the shaft I*a*.

The switches formed by the contact banks SA, SB . . . SH and the wipers S*a*, S*b* . . . S*h* will in the following be referred to as the pulse selectors.

In the above example, the first pulse selectors, viz. SA—S*a* will be set on its bank contact connected to the pulse transmitter $I_5$ corresponding to the digit value 5 at the same time as the register switch SV*a*—V*a* is set on the bank contact of same corresponding to the digit value 5. The wiper S*a* as mentioned is moved synchronously with the wiper V*a* for which purpose the wipers and banks of the two switches may be assumed in reality to represent different parts of one and the same rotary selector switch and the same arrangement applies to the other pairs of wipers V*b*—S*b*, V*c*—S*c* . . . respectively, but it is observed that the pulse selector may alternatively constitute separate switches which are independent of the switches formed by the banks SV*a*, SV*b* . . . SV*h* and wipers V*a*, V*b* . . . V*h*, only also in this case the wipers of each pulse selector is to be set synchronously with wipers of an individual one of the input-register switches.

When the digit 3 was struck as referred to above the wiper S*b* of the pulse selector SB is set simultaneously with the wiper V*b* and the register switch SV*bm* so that the pulse transmitter $I_3$, the pulses of which correspond to the digit value 3, is connected to the wiper S*b*.

In the manner described further digit numbers of a desired number will be registered in the input register switches by continued operation of digit transmitting member at the operating position, while at the same time the pulse transmitters corresponding to the digits of the number are connected to wipers of the respective pulse selectors.

The wipers $Sa$, $Sb$ . . . $Sh$ of the pulse selectors are connected each to the movable contact of an individual contact $mk$ of a change-over switch MK arranged to connect the said wipers each to an individual wiper of either a first group $b$ of selector switches A, B, C . . . H or of a second group of selector switches A', B' . . . D', more especially referred to below, by way of conductors $l_5$ or $l_6$, respectively. The selector switches A, B, C . . . H and A', B', C', D' are in the following to be referred to as first column switching devices. The contacts of the switches A, B, C . . . H are cross-coupled to the operating members RKTM, RKM, RKHT, RKTT, RKT, RKH, RKT*i*, RKE, RK01, RK001, RK0001 of the registering units TM, M, HT, TT, T, H, T*i*, E, 0,1, 0,01, 0,001 respectively of the accumulator register $c$. The registering units denoted by 001, 01, 1, E, Ti, H, T, T*i*T, HT, M and TM are arranged to register the digits of a number representing thousandths, hundredths, tenths, units, tens, hundreds, thousands, ten thousands, hundred-thousands, millions and ten millions, respectively and may be of any suitable well known construction, adapted to be set to different positions depending upon the durations or combinations of electric pulses transmitted from the pulse transmitters $I_1$ . . . $I_9$ to the operating members RKE, RKT*i*, RKH, RKT, RKTT . . . RKTM of said registering units which operating members may each consist of electric magnets adapted to couple a rotatably mounted digit-disc of the appurtenant registering unit temporarily to a continuously rotated shaft; registering units of this kind are described in my copending application Serial No. 765,977, now Patent No. 2,548,954; see also the description below of the registering unit represented in Fig. 3.

When the relay MK the energizing circuit of which is to be closed by a key MKT at the operating apparatus $d$, is not energized the wipers $Sa$ . . . $Sh$ are connected to the wipers of the column switching devices A, B . . . H by way of the contacts $mk$. If energized the relay MK shifts the contacts $mk$ over to connect the wipers $Sa$—$Sb$ of the input-register to a second column shifting device A' . . . D' more especially referred to below.

From what has been said it will be seen that for each register switch SV$a$ . . . SV$h$ taken into use in registering a number a connection is established between a pulse transmitter $I_1$ . . . $I_9$ and the operating member of a registering unit of the calculating group $c$. The order and succession in which these registering units are connected to the pulse switches SA, SB . . . SH is determined by the multiple connection of the column shifting devices A, B . . . H with said registering units and by the setting of the column shifting devices A, B, C . . . H. The column shifting devices A, B . . . H are set stepwise synchronously with the sequence switch STV by means of an operating magnet KV, when the integers of a number, i. e., all the digits before the decimal point are struck at the digit transmitting members 1, 2 . . . 0. The energizing circuit of the magnet KV is so arranged, as described below that the column shifting devices A, B . . . H remain at rest, when decimal fraction digits, i. e., digits after the decimal point, are struck as will be described in further detail in the following.

The calculator switches forming the first column shifting device have a common driving shaft $ah$ and the control circuit of the operating magnet KV of these selectors is normally connected in parallel to the control circuit of the operating relay ST of the sequence switch by way of a conductor $e_2$ a contact $dm_1$ of a relay D$m$ to be mentioned in the following and the conductor $e_3$ which is connected to the conductor $e_1$ by way of a relay contact $mk_1$ of the relay MK. Each time a key contact 0–9 at the operating position $d$ is operated, the column shifting devices A, B . . . H, which are all mechanically interconnected in such a manner that their wipers are simultaneously moved, will be advanced by one step only, and this takes place each time a new digit is struck and a new register switch SV$b$ . . . SV$h$ is thereafter taken into use. This stepping of the devices A, B . . . H serves the purpose of securing that the digits registered in the register switches SV$a$ to SV$h$ when transferred to the calculating group $c$ in this group are each recorded in that register unit which represents the decade of the decimal system to which each digit in question belongs by virtue of its decimal position in the number in question, in other words, if a three digit number is registered in the register which means, as will be understood from the foregoing description, that the unit digit of the number is registered in the switch SV$c$, the tenth digit in the switch SV$b$ and the hundredth digit in the switch SV$a$ then when these digits are transferred to the accumulator register they are to be transferred to definite registering units, viz. E, T*i* and H, respectively, which registering units irrespective of the siz of the number always represent units, tens, and hundreds, respectively, in the accumulator register as distinct from the condition in the input-register in which the decade represented by the digit as registered in the register switch depends on the number of digits struck.

Now with a view to the above considerations, the multiple connection between the first column shifting devices and the setting members for the registering units E, T*i*, H, T, T*i*T and HT and M, etc. of the accumulator register is as referred to above arranged in such a manner that when the first register switch SV$a$—SA is set the simultaneous stepping of the first column shifting devices by one step causes the switch A to establish a connection between the wiper $Sa$ of the pulse selector SA and the setting member RKE for the registering unit E of the accumulator register $c$ in which registering unit E the digits representing units of a number are to be recorded, seeing that the digit first struck by means of one of the digit transmitting members 0–9, must be interpreted as a unit digit as long as a further digit has not been struck. When a second digit is struck and the sequence switch STV is thereby advanced by one step to cause the second switch SV$b$—SB of the register to record this second digit, then all of the column shifting devices A . . . H are simultaneously advanced one step due to the circumstance that the operating magnet KV is energized in the circuit comprising the operated key, conductors $e$ and $e_2$ in series, contact $dm_1$, conductor $e_1$, contact $mk_1$, conductor $e_3$, the energizing winding of magnet KV and current source $f$ simultaneously with the energizing of the operating magnet ST of the sequence switch as described above. As a consequence of the said stepping of the column shifting devices, the switch A, as will be seen from Fig. 2, connects the wiper $Sa$ of the pulse selector SA to the setting member RKT*i* for the registering unit T*i* of the accumulator register, while at the same time, the switch B connects the wiper $Sb$ of the pulse selector SB to the setting member RKE for the registering unit E of the accumulator register. When a third digit is struck and the column shifting devices A . . . H are again advanced by one step the connections between the said switches and the calculating group, just described, are transferred in such a manner that the wiper $Sa$ of the pulse switch SA is connected to the setting member R*k*H for the registering unit H of the accumulator register, while the wiper $Sb$ of the pulse selector SB is coupled to the setting member RKT*i* for the registering unit T*i*, and the wiper SC of the pulse selector SC is connected to the setting member RKE for the registering unit E of the calculating group $c$.

When all the digits of the number in question have been successively struck and the input-register switches and the first column shifting devices have thereby been set in accordance with the number in question, the latter is to be transferred to the registering units of the calculating group $c$ and the register switches and first column shifting devices and the sequence switch are to be returned to their home position in order to be ready for the receiving of a further number to be added to or subtracted from that previously recorded in the accumulator register $c$. To this end the pulse transmitter $I_0$–$I_9$ is to be put into action. To effect this, a particular key TS, hereinafter called the termination key, at the operating device $d$ is struck. Thereby a circuit is completed extending from earth via the key TS, a conductor $l$, a contact $mr$, Fig. 2, of a relay MR to be more specially referred to below and a conductor $l_1$ to the operating relay I$m$ of the axle I$a$ of the pulse transmitter $I_0$ . . . $I_9$ and thence by way of the source $f$ to earth. The pulse transmitter is thereby started and operates to supply a current pulse over each of the first column shifting devices A . . . H to the setting members of those of the registering units of the accumulator register $c$, the setting members of which by the operation of the first column shifting devices A . . . H as described above have been connected upon the circuit of one or other of the pulse transmitting members $I_0$–$I_9$ so that the said registering units are set in accordance with the pulses in question and thereby in accordance with the corresponding digits. The impulse transmitter $I_0$–$I_9$ is arranged to be rotated one complete revolution each time the relay or magnet I$m$ is operated, i. e., each time one of the digit transmitting members 0–9 are struck. How to arrange driving magnet or relay to fulfil this purpose is well known in the art and may be performed in different manner. As an example on the drawing the armature of the relay I$m$ is a toothed rod $ri$ adapted to move into the coil or solenoid of the relay when energized. The rod $ri$ meshes with a toothed wheel or pinion $pi$, which is rigidly attached to and co-axial with a larger gear wheel $gi$, and arranged to freely rotate about an axle $ai$. The gear wheel $gi$ meshes with a smaller gear wheel $wi$ on the shaft I$a$ of the impulse transmitter. When the key TS is operated, the magnet or relay I$m$ attracts the armature $ri$, thus causing the wheel $ai$ and $pi$ to rotate in direction of the arrow, and consequently causing the wheel $wi$ to rotate the shaft I$a$ in the opposite direction.

A radial projection $si$ on the gear wheel $gi$ is moved against an abutment to stop rotation of the shaft I$a$ when rotated through an angle of 360°. At the same time a contact $ci$, arranged to be closed by relay I$m$ when energized is opened mechanically by the armature $ri$ when attracted. The purpose of said contact is to ensure that relay I$m$ when energized by the operation of the key TS is not de-energized by the release of the key before the relay I$m$ has fulfilled the attraction of its armature $ri$. Contact $ci$ is shunted to winding of the relay I$m$ in series with the current source $f$.

The wheel $wi$ is arranged to freely rotate about the shaft I$a$ when rotated by the wheel $gi$ during the return motion of the armature $ri$ when released. A spring $fi$ causes the return motion of armature $ri$.

When the calculating apparatus is used for addition one of the numbers in question is first recorded in the input-register and transferred therefrom to the accumulator register $c$ whereafter a further one of the numbers in question is recorded in the register and transferred to the calculating group as described above whereby an addition is effected in the registering units of the accumulator register $c$. To this end the registering units of the calculating sets may be arranged in different, well known manner as an example reference is made to Fig. 3 representing a registering unit more especially referred to below.

As it appears from the description of switches SV$b$–SV$h$ and the pulse selector switches SA–SH these switches are intercoupled in pairs so that two of such selector switches are to be set by one of the same setting magnet $SV_1$ . . . $SV_8$. Each such set of two appurtenant switches is provided with a ratchet wheel $wh$, Fig. 1, arranged to rotate together with said switches and against the action of a spring $sp$ tending to return the wiper arms of the selectors to their home position. This is prevented by a pawl $pw$ engaging the toothed wheel $wh$. When the shaft I$a$ of the impulse transmitters has been rotated nearly through a full revolution a cam $cr$ on a disk CR rotated by the shaft I$a$ temporarily engages a contact lever $cl$ to cause a contact $c_1$ to engage a contact $c_2$ thereby completing an operation circuit through a relay HM which disengages the pawl $pw$ from the wheel $wh$ thus allowing the spring $sp$ to return the selector switches to their home position. The said operating circuit discloses current source $f$, the winding of relay HM, conductor $l_{18}$, contacts $c_1$ and $c_2$, conductor $l_{19}$, a contact $mr_1$ of relay MR, more especially referred to below, conductor $l_{20}$ and earth.

Similarly the common shaft $ah$ of the wipers of all of the column shifting devices A . . . H is provided with a pawl wheel $wha$, Fig. 2, which is rotated against the action of a spring $wp$, when the said devices are operated as described above. A pawl $pwa$ engages said pawl wheel to prevent the shaft $ah$ and the wipers of the cross coupling switches to return to home position when set. The said pawl is operated by a relay HKM which disengages the pawl $pwa$ from the wheel $wha$ thus allowing the spring $wp$ to return to column shifting devices to home position when the shaft I$a$ of the pulse transmitters causes the cam $cr$ to temporarily actuate the contact lever $cl$ to cause the contact $c_1$ to engage contact $c_2$ as described above and at the same time causing a contact $c_3$ to engage a contact $c_4$ thus closing the operating circuit of relay HKM from earth, conductor $l_{20}$, contact $mr_1$, conductor $l_{19}$, contact $c_3$, contact $c_4$, conductor $l_9$, energizing coil of relay HKM and current source $f$.

As will be understood from what has been said, the column shifting devices A . . . H are caused to perform a continually proceeding transfer of the connections to the registering unit of the calculating set $c$, which transfer is necessary because as referred to above the digits of the number are recorded in the register in the succession in which they are written and must be interpreted as representing a varying decade gradually as an increasing number of digits are struck seeing that the striking of each new digit promotes all digits previously struck to a higher decimal position or decade in the decimal system. If, however, the number to be registered contains decimal fraction digits then, as mentioned above, when the decimal fraction digits are struck no promotion of the digits previously registered in the accumulator register, i. e., the digits before the decimal point is to take place because the value of these digits is not to be changed for the reason that decimal fraction digits are added. Accordingly, the stepping of the calculator switches is to cease when the decimal fraction digits are to be registered.

For this purpose, according to the invention, the switch over contact $dm_1$ of a relay DM in the following to be referred to as the decimal-point-relay is interposed in the circuit of the operating magnet KV of the calculator switches. The said relay DM is operated by a particular key DR, the decimal-point-key at the operating position. This key is struck when the unit digit of the number in question has been struck. When the key DR is operated the control circuit of the relay DM is completed by way of the conductor $l_3$, the winding of relay DM and current source $f$. The relay DM locks itself by way of a contact $dm_2$, while at the same time switching the contact $dm_1$ in the energizing circuit of the stepping magnet KV of the column shifting devices A . . . H over so that the relay KV is disconnected from the conductor $e$. During subsequent operations of digit transmitting members 0 . . . 9 at the operating position the calculator switches will therefore remain at rest and will not follow the setting of the sequence switch or in other words, the connections to the setting members for the registering units of the accumulator register $c$ already established by way of the column shifting devices A . . . H will not be altered by a subsequent registration of decimal digits.

As will be seen from Fig. 2, the connections between the column shifting devices and the setting members RK for the registering units 1,01, and 001 serving to register decimal fraction digits in the accumulator register $c$ are arranged in such a manner that irrespective of which ones of the register switches with appurtenant pulse selector switches and the calculator switches connected therewith are first taken into use in registering the first decimal fraction digit the connection from the pulse transmitters by way of the first column shifting devices A . . . H of the calculating set $c$ is always extended to the setting member RK01 for registering member 0,1 serving to register the first decimal fraction digit in the accumulator register. At the registration of the subsequent second decimal fraction digit the connection from the pulse switch which is then to be taken into use to the appurtenant column shifting device is extended directly to the setting member RK001 through said calculator switch.

As referred to above the operation of the key TS after the recording of a number in the calculating set $c$ and a subsequent recording of a second number in the register $a$ causes an addition of the said two numbers in the units of the accumulator register by means of pulses transmitted from the transmitter $I_0$–$I_9$. These pulses are as referred to above of different durations depending upon the value of the digits of the number in question, and in order to describe how the registering units 0,001, 0,01, 0,1, E, T$i$, H, TT, HT, M and TM of the accumulator register is set in accordance with the durations of said pulses reference is made to Fig. 3 representing a registering unit of the accumulator register $c$. All of the registering units of the accumulator register $c$ are of exactly the same structure, and comprises each a drum RR, Fig. 3, provided with digit indication 0–9 distributed uniformly along the circumference of the drum.

The drums RR of all of the registering units of the calculating set $c$ are arranged to rotate about a common shaft 300. One or other face of the drum RR is assumed to be engaged by some or other suitable stationary friction member, e. g. a leaf spring or a pad of caoutchouc or similar plastic material arranged to prevent the drum from rotating if the drum is not coupled to the shaft 300 by means of a clutch CC. The shaft 300 is to be rotated by an electric motor V which motor is coupled to the shaft 300 by means of a reversible gear RG, the control lever $rg$ of which is arranged to be controlled by an electromagnetic relay EM. Normally, which means when a calculating operation to be performed is not a subtraction, the motor rotates the shaft 300 continuously in a certain direction of revolution, e. g. a direction of the arrow in Fig. 3 and the relay EM is not energized. Each drum RR is arranged to be coupled to the rotating shaft 300 by means of a magnetically controlled clutch CC having one part rigidly attached to the drum and the other part arranged to be slid along the shaft 300 and to rotate together with same. The clutch CC is engaged by means of a fork F$f$ arranged to be moved by energization of relay RK and be disengaged by a spring F$r$ when the relay RK is de-energized. The relays RK of the various energizing units of the accumulator register $c$ are multiple-connected to the column shifting devices A . . . H as described above. It would be evident that the duration of the engagement of the clutch CC of a registering unit and consequently the angle through which the drum RR of such unit is rotated when the clutch CC is engaged, depends upon the duration of the pulses transmitted to the relay RK from the pulse transmitter. Further explanation with respect to how the registering units of the accumulator register are set to desired position appears to be superfluous to an expert in the art.

The construction of a selector switch, which operates as a finder, just as the switches V$a$ . . . V$h$ and how such switches are caused to move when their operating relays or magnets SV, $SV_1$ . . . $SV_8$ are energized, is well known in the art, e. g. from automatic telephone systems and is therefore not to be described in detail, and how to construct the driving mechanism of a selector switch such as the sequence switch STV and the column shifting devices A . . . H, which are to be set stepwise by alternating energization and de-energization of their control magnets is also well known in the art to any expert in automatic telephone apparatus for which reason such construction need not to be described.

As appears from Fig. 3 a circular disc $ds$ being coaxial with the drum RR is firmly attached to same, and on its circumference the said disc has a nose or cam $dsn$, which when the drum RR is in its home position would occupy the position $dsn_1$ indicated with dotted lines in Fig. 3, in which position the said nose engages a contact lever $nr$ of a contact set comprising contacts $r$, $r_1$, $r_2$, $pr$ and $qr$. The purpose of the contact $r$, $r_2$ is referred to below.

If a subtraction operation is to be performed the control magnet EM of the reversible gear RG is energized by remote control, e. g. by means of a key E$m$ at the operating place, Fig. 1.

In the performance of multiplication one factor is first recorded in the input-register "$a$" in the manner described above whereafter a particular key contact MTK at the operating position is operated. Thereby a relay MK is energized by way of the key contact MTK and a conductor $l_4$ to change over the contacts $mk$, Fig. 2, to the conductors $l_{16}$ from the conductors $l_{15}$ between the wipers of the pulse selectors and the wipers of the column shifting devices A, B . . . H whereby the connection from the wipers S$a$, S$b$ . . . S$h$ to the column shifting devices A . . . H is interrupted. Some of the wipers S$a$, S$b$ . . . S$h$ are instead connected via the conductors $l_{16}$ in Figs. 1 and 2 each to the wiper of a separate one of a number of selector switches A′, B′, C′ and D′ forming a second column shifting device $b_1$ and having their bank contacts cross-coupled to the setting members IR, $IR_1$, $IR_2$ and $IR_3$ of the registering units 0,01′, 0,1′, E′ and T$i$′ of a multiplier register M similarly as the selector switches of the first column shifting devices A, B, C, D . . . H are connected to the setting members RK of the registering units of the accumulator register $c$. At the same time the contact $mk_1$ of the relay MK shifts the connection from the conductor $e_1$, Fig. 1, to the winding of the magnet KV over to a corresponding magnet KV$b$ of the second column shifting devices A′ . . . D′ through the conductor $l_{14}$. To simplify the illustration only four second column shifting devices A′ . . . D′ and four registering units 0,01′, 0,1′, E′ and T$i$ are shown in the second column shifting device $b'$ and the multiplier register M respectively, however the number of such switches and units may be any other desired one depending upon the number of digits in the largest number to be recorded in said groups.

The registering units of the multiplier register M are selector switches arranged to be operated as described below. The bank contacts of all of the banks of this group, except the first contact $n$, $n_1$, $n_2$ and $n_3$ respectively of each bank—the home contact—are connected to a common conductor L and the wipers of each of these switches are arranged not to engage two consecutive bank contacts simultaneously when sweeping over their respective banks.

In case of a multiplication operation the key TS is struck after the key MKT has been struck to connect the selected pulse transmitting members $I_0$ . . . $I_9$ corresponding to the number recorded in the register units to the second column shifting devices A′ . . . D′. By way of these switches the pulses are transferred to the respective setting member IR, $IR_1$, $IR_2$ and $IR_3$ of the group M and the wipers of the units 0,01′, 0,1′, E′ and T$i$′ are then each set on a bank contact of their respective banks, corresponding to one digit of the number in question.

When the first factor has been transferred to the multiplier register M in the manner described, and the switches of the register have been automatically homed in the manner described above the second factor is registered in the register *a*. It should be remarked that the second column shifting devices A′ . . . D′ are caused to return to their home position in a similar manner as the first column shifting devices A . . . H as described above, viz. by the closure of a contact $c_5$, Fig. 1, at the shaft I*a* when the nose *cr* engages contact lever *cl*. The said contact $c_5$ completes a circuit from conductor $l_{19}$, contact $c_5$, conductor $l_{21}$, relays HKK and current source *f* to release the pawl *pwb* from a pawl *wbb* on the common axle of the second column shifting devices A′ . . . H′, allowing spring *wb* to return said switches to their home position.

Now, when the multiplication of two members registered in the register *a* and multiplier register M respectively is to be effected a key contact MT, the multiplication key, at the operating position is first struck whereby a relay MR hereinafter referred to as the multiplication relay, is energized by way of key MT, the conductor $l_7$, the winding of relay MK and the source *f*, so as to open a contact *mr* in the connection between the conductor $l_1$ leading to the operating relay I*m* of the pulse transmitters and the conductor *l* leading to the termination key TS and to close a further contact $mr_2$ connecting the conductor *l* to one end of the winding of the driving magnet or relay MAR of an interrupter I*x* by way of the conductor $l_8$ and the said contact $mr_2$. When the termination key TS is thereafter operated, the relay MAR is energized to attract its armature *ar* being a toothed rod meshing with a pinion $ar_1$ geared to the gear wheel $ar_2$ on an axle *ix* so as to rotate said axle by 360° each time the relay MAR is energized, similarly as the relay or magnet I*m* rotates the transmitter $I_0$ . . . $I_9$ as described above. During the rotation of the axle *ix* two contacts $mar_1$ and $mar_2$ engaging the circumferential edge of an insulating, circular disc I*x* on the axle *ix* are engaged one after the other by a contact *cx* at the circumference of said disc. The said contact *cx* is connected to the axle *ix* being grounded. The two contacts $mar_1$ and $mar_2$ are connected each to one of two contact-makers *x* and $x_1$ associated with the registering units 01′, 1′ in the multiplier register M representing decimal fraction digits. These contact-makers *x* and $x_1$ are so arranged relatively to the wipers of these registering units 0,01 and 0,1 of multiplier register M that as a digit is registered in any of these two registering members viz. if the factor registered in the multiplier register comprises one or more decimal fraction digits, one or both of the contact-makers *x* and $x_1$ and similar contact-makers of possible further decimal fraction registering members, if any, that have been taken into use in the multiplier register, will be in their closed position, which has the effect, that the interrupter I*x* when operated supplies current pulse first through the contacts $mar_1$ and contact maker *x* and then through the contacts $mar_2$ and contact maker $x_1$ to the operating magnet KV of the first column shifting devices A, B, C, D . . . H. The circuit thus extending through the winding of the relay KV is completed via the said contacts $mar_1$ or $mar_2$, contact maker *x* or $x_1$ the conductor $l_2$, the switch over contact $dm_1$ in the decimal-point-relay D*m*, being energized at the operation of the decimal-point-key DR, the conductor $e_1$, contact $mk_1$ and conductor $e_3$. Now the interrupter I*x* is arranged to cause the contact $mar_2$ being engaged by the said contact *cx*, so as to first transmit one pulse to the relay KV by way of the contact $mar_2$ and the contact maker $x_1$ and then, provided both decimal fraction registering members of the multiplication group have been taken into use another pulse to the same relay over contacts $mar_2$ and contact-maker *x* so that the operating relay KV of the first column shifting devices A . . . H will receive two pulses that cause these switches to be moved in the backward direction by two steps. The backward stepping of the first column shifting devices A . . . H by means of the stepping relay KV may be effected in any well known manner, e. g. by shifting a reversible gear *kvg* in the driving mechanism, not shown between the relay KV and the wipers of said switches by means of an electric relay *krg* which to this end is connected up in a circuit, including earth, the energizing winding of said relay *krg*, conductor $l_{22}$ and a contact *mar* being closed by relay M*ar* when this relay is energized as described above. By this backward stepping of the first column shifting devices A . . . H all the connections from the pulse switches SA . . . SH to the setting members RK of the registering units of the accumulator register *c* are changed over so that for each decimal fraction digit occurring in the factor registered in the multiplier register the said connections are changed to the setting member of the registering units representing the next lower order (decade), i. e., the number is degraded corresponding to a division of the factor registered in the register switches by the number 10 for each decimal fraction digit in the multiplication group. This serves to fix the position of the decimal point in the product of the two factors, which is thereafter automatically computed in the accumulator register, viz. when the termination key TS at the operating position is released and thereby opens the operating circuit of the relay M*ar*, whereby the latter allows the contact *mar* to interrupt the connection to relay *krg* to complete a circuit connection from the current source *f* through conductor $l_3$ and a contact *z* to the setting member IR of the registering member 0,01′ in the multiplier register M so that the wiper *y* of this registering member is homed and in moving from one bank contact to the next one alternately opens and re-closes one or more times depending of the number of bank contacts passed by the wiper a circuit extending from earth by way of the wiper *y* of the registering member 0,01, the bank contacts swept by this wiper, the conductor L between all of the bank contacts except the home contacts of the registering members of the register M and the contact *mr*, the conductor $l_1$ and the operating relay I*m* of the pulse transmitters $I_0$ . . . $I_9$, whereby all these pulse transmitters are operated once, each time the said circuit is opened and re-closed and caused to rotate 360° a number of times corresponding to the value of the digit on which the wiper *y* was originally set. This has the effect, that the number registered in the input-register *a* is transferred to the calculating group by way of the pulse switches SA, SB . . . SH and the calculator switches A, B . . . H taken in use by the recording of the member in question in the register a number of times corresponding to the value of the said digit, or in other words is transferred to the calculating group as multiplied by the said digit as multiplicator.

During this multiplication operation the passage of pulse transmitters $I_0$ . . . $I_9$ does not cause the return of the register switches and the cross coupling switches to their home positions because the relay MR having been operated by key MT has opened the contact $mr_1$ over to interrupt the releasing circuits of the relays HM and HKM. The said switches are only caused to return to their home position when all of the wipers of the registering members of the group M have returned to their home positions and thereby have caused a number of contacts *n* to be connected up in series with the wipers *y*, $y_1$, $y_2$ and $y_3$ when all of said wipers are set to home position as described below. Then a circuit is completed from earth through wiper *y*, contact *n*, wiper $y_1$, contact $n_1$, wiper $y_2$, contact $n_2$, wiper $y_3$, contact $n_3$, conductor $l_{11}$, conductor $l_{19}$, the contacts $c_2$, $c_3$, $c_5$, conductors $l_{18}$, $l_{19}$ and $l_{21}$ in parallel and the respective relays HM, HKK and HKM. When this occurs the springs *sp* and *pwa* and *wb* reset the switches SV*a* . . . SV*h* and A, B . . . H.

When the wiper *y* is homed as described, a so-called hold contact *z* is mechanically shifted over by the wiper or other moving part of the switch to a position in which the connection to the setting member IR of the switch 0,01′ in question is interrupted and a contact $z'$, which is connected to the hold contact $z_1$ of the switch 0,1, is engaged by contact $z$. This causes the operating relay $IR_1$ of the tenths registering unit 0,1 in the multiplication group M to be operated, and the wiper $y_1$ of this registering unit is then automatically homed and during this homing creates pulses exactly in the same manner as described in the case of the wiper $y$, which pulses are supplied to the operating relay I$m$ of the pulse transmitters $I_0$ . . . $I_9$ by way of the conductor L and $l_1$.

The pulse transmitters are then again caused to transmit pulses a number of times corresponding to the value of the digit which was recorded in the unit 0,1′. Thus the number recorded in the register is transferred to the calculating set a number of times corresponding to the value of said digit.

When the wiper $y_1$ reaches its home position, it shifts the contact $z_1$ over to engage a contact $z'_1$, connected to home contact $z_2$. A circuit is then closed by way of the setting member $IR_2$ for the registering unit E′ of the multiplier register M, whereby the wiper $y_2$ of this registering unit is homed and exactly like the wipers of the registering members 1 and 01 supplies pulses to the operating relay I$m$ to cause the transmission of pulses to the registering member of the accumulator register $c$ a number of times corresponding to the value of the digit recorded in the unit E′ of the register M.

In this manner the registering members of the multiplication group are all automatically homed one after the other, thereby delivering a number of operating impulses corresponding to the digit value of their original setting to the operating relay I$m$ of the pulse transmitter $I_0$ . . . $I_9$, so that for each such pulse the said relays transfer the number registered in the input-register $a$ once to the accumulator register $c$.

As will be understood to effect the multiplication the number registered in the register is multiplied by each of the digits of the number registered in the multiplication group. When proceeding from multiplication by one of these digits to multiplication by the next higher digit the product resulting from the latter multiplication must, as is well known, be added to the product resulting from multiplication by the preceding digit as promoted by one digit, or in other words, as multiplied by the number 10.

To effect this the column shifting devices A, B . . . H is automatically advanced by one step, each time of the wipers $y$, $y_1$, $y_2$ . . . of the multiplier register is homed and to this end the setting members IR, $IR_1$, $IR_2$ and $IR_3$ complete an earth connection through contacts $u$, $u_1$, $u_2$ and $u_3$ respectively to a conductor $l_{12}$ when energized. This earth connection when established will have the effect that the operating relay KV of the cross coupling group receives a pulse in a circuit completed by the contact $u$, $u_1$, $u_2$ or $u_3$ in question and extending from earth over said contact, the conductor $l_{12}$, contact $mk_1$, conductor $e_3$ and the winding of magnet KV to current source $f$. Each such pulse advances all cross coupling switches by one step prior to the transmissions of pulses to the calculating set by the operation of the wipers $y$, $y_1$, $y_2$ and $y_3$.

When the multiplication is finished, all switches of the register and the cross coupling group $b$ are automatically released and taken to their home position as described below and relay HM or shaft SV opens a contact $hmi$ in the locking circuit of relay R.

I claim:

1. In an electric calculating system a source of electric current, digit transmitting members, an input register comprising a number of registering units to be set each in conformity to a separate one of the digits of a desired figure, a separate setting member for each of said registering units, a control switch arranged to be set to different positions for connecting said setting members separately and in a predetermined sequence up in an operating circuit including in series the said control switch, the said current source and the setting member in question, an operating member for said control switch, a number of contact makers interconnected in parallel and associated each with a separate one of said digit transmitting members to automatically make contact each time the associated digit transmitting member is operated, a control circuit including in series said contact makers, the operating member of said control switch and the said current source, an accumulator register, comprising a plurality of registering units, means for transferring a record of digits stored in the registering units of the input register to the registering units of said accumulator register, said means comprising a pulse transmitter having members for generating a number of different electric pulses corresponding each to a separate one of the digits of the decimal system, a member for operating said pulse transmitter, a first group of selector switches associated each with an individual one of the registering units of the input register to select automatically in dependency of the setting of the associated registering unit the pulse generating member corresponding to the digit stored in said registering unit, and a second group of selector switches forming a column shifting device for selecting the registering units of the accumulator register, which in case of the transfer of a record from the input register to the accumulator register are to be connected up in circuits including the selected pulse generating members and the selector switches of said first group; a multiplier register having a number of registering units, means for transferring a record of digits stored in the input register to the registering units of said multiplier register, said means comprising the said first group of selector switches and a second column shifting device consisting of a third group of selector switches for selecting the registering units which in case of a transfer of a record of digits from the input register to the accumulator register are to be connected up in the circuits of the pulse generating member selected by the said first group of selector switches, a multipoled through-over switch for alternately connecting the selector switches of said first column shifting device and of said second column shifting device up in the circuits of the pulse generating members, a separate operating member for each of said second and third group of selector switches, means for connecting the operating member of any of these two groups of selector switches separately up in parallel to the operating circuit of the said control switch, and a multiplication circuit for controlling a transfer of a record of digits from the input register to the accumulator register so as to be effected a number of times corresponding to the value of a record of digits having in advance been transferred from the input register to the multiplier register, the said multiplication circuit including in series the said electric current source, the operating member of the said pulse transmitter, an operating contact to be closed by remote control and the registering units of the multiplier register.

2. In an electric calculating system according to claim 1, means for preventing the operating members of the selector switches of the second and third group of selector switches from being energized when a digit representing a decimal is recorded in the input register.

3. In an electric calculating system according to claim 1, means for setting each of the selector switches multipled to the pulse generating members stepwise synchronously with a separate one of the registering units of the input register, means for advancing the selector switches of the first column shifting device one step each time a digit to be transferred to the accumulator register is registered in the input register, a relay for preventing when energized such stepwise advance of the first column shifting device if a digit representing a decimal is to be set up in the input register, and means for starting the operation of the pulse generating members for effecting the said transfer when all of the digits of a multi-digit number are set up in the input register.

4. In an electric calculating system according to claim 1, means for setting the selector switches multipled to the pulse generating member stepwise synchronously with the registering units of the input register and means for advancing the selector switches of the second column shifting device one step each time a digit to be transferred to the multiplier register is recorded in the input register, means for preventing such stepwise advance of said third group of selector switches if a digit representing a decimal is to be set up in the input register, and means for starting the operation of the pulse generating members for effecting the said transfer, when all of the digits of a multi-digit number are set up in the input register.

5. In an electric calculating system according to claim 1, a circuit including in series the said current source and the operating member of the said first column shifting device and means controlled by the registering units of the multiplier register to close and thereby to energize the said circuit each time any of the registering units of the multiplier register have been set to register a digit is re-set to home-position.

6. In an electric calculating system a source of electric current, digit transmitting members, an input register comprising a number of registering units to be set each in conformity to separate one of the digits of a desired figure, a separate setting member for each of said registering units, a control switch arranged to be set to different positions for connecting said setting members separately and in a predetermined sequence up in an operating circuit including in series the said control switch, the said current source and the setting member in question, an operating member for said control switch, a number of contact makers interconnected in parallel and associated each with a separate one of said digit transmitting members to automatically make contact each time the associated digit transmitting member is operated, a control circuit including in series said contact makers, the operating members of said control switch and the said current source, an accumulator register, comprising a plurality of registering units, means for transferring a record of digits stored in the registering units of the input register to the registering units of said accumulator register said means comprising a pulse transmitter having members for generating a number of different electric pulses corresponding each to a separate one of the digits of the decimal system, a member for operating said pulse transmitter, a first group of selector switches associated each with an individual one of the registering units of the input register to select automatically in dependency of the setting of the associated registering unit the pulse generation member corresponding to the digit stored in said registering unit, a second group of selector switches forming a first column shifting device for selecting the registering units of the accumulator register, which in case of the transfer of a record from the input register to the accumulator register are to be connected up in circuits including the selected pulse generating members and the selector switches of said first group; a multiplier register having a number of registering units, means for transferring a record of digits stored in the input register to the registering units of said multiplier register, said means comprising the said first group of selector switches and a second column shifting device consisting of a third group of selector switches for selecting the registering units which in case of a transfer of a record of digits from the input register to the multiplier register are to be connected up in the circuits of the pulse generating member selected by the said first group of selector switches, a separate operating member for each of said first and second column shifting devices, a decimal point relay, means for remote control of said relay, a switch-over contact arranged to be operated by said relay when a digit representing a decimal is recorded in the input register remotely controlled means for connecting the operating members of said two column shifting devices separately to the movable contact member of said switch-over contact arranged to connect when not operated, the operating member of the column shifting device up in parallel to the operating member of said control switch, and a multiplication circuit for controlling a transfer of a record of digits from the input register to the accumulator register so as to be effected a number of times corresponding to the value of a record of digits having in advance been transferred from the input register to the multiplier register, the said multiplication circuit including in series the said electric current source, the operating member of the said pulse transmitters, a starting contact (*mr*) arranged to be closed by remote control and all of the registering units of the multiplier register in parallel.

7. In an electric calculating system a source of electric current, digit transmitting members, an input register comprising a number of registering units to be set each in conformity to a separate one of the digits of a desired figure, a separate setting member for each of said registering units, a control switch arranged to be set to different positions for connecting said setting members separately and in a predetermined sequence up in an operating circuit including in series the said control switch, the said current source and the setting member in question, an operating member for said control switch, a number of contact makers interconnected in parallel and associated each with a separate one of said digit transmitting members to automatically make contact each time the associated digit transmitting member is operated, a control circuit including in series said contact makers, the operating member of said control switch and the said current source, an accumulator register, comprising a plurality of registering units, means for transferring a record of digits stored in the registering units of the input register to the registering units of said accumulator register, said means comprising a pulse transmitter having members for generating a number of different electric pulses corresponding each to a separate one of the digits of the decimal system, a member for operating said pulse transmitter, a first group of selector switches associated each with an individual one of the registering units of the input register to select automatically in dependency of the setting of the associated registering unit the pulse generating member corresponding to the digit stored in said registering unit, a second group of selector switches forming a first column shifting device for selecting the registering units of the accumulator register, which in case of the transfer of a record from the input register to the accumulator register are to be connected up in circuits including the selected pulse generating members and the selector switches of said first group; a multiplier register having a number of registering units, means for transferring a record of digits stored in the input register to the registering units of said multiplier register, said means comprising the said first group of selector switches and a second column shifting device consisting of a third group of selector switches for selecting the registering units which in case of a transfer of a record of digits from the input register to the accumulator register are to be connected up in the circuits of the pulse generating member selected by the said first group of selector switches, a separate operating member for each of said first and second column shifting devices, a decimal point relay, means for remote control of said relay, a switch-over contact arranged to be operated by said relay when a digit representing a decimal is recorded in the input register, remotely controlled means for connecting the operating members of said two column shifting devices separately to the movable contact member of said switch-over contact arranged to connect when not operated, the operating member of the column shifting device up in parallel to the operating member of said control switch, a multiplication circuit for controlling a transfer of a record of digits from the input register to the accumulator register so as to be effected a number of times corresponding to the value of a record of digits having in advance been transferred from the input register to the multiplier register, the said multiplication circuit including in series the said electric current source, the operating member of the said pulse transmitters, a starting contact (*mr*) arranged to be closed by remote control and all of the registering units of the multiplier register in parallel, and circuit connections controlled by the registering units of the multiplier register to advance the said first column shifting members by one order each time the registering unit of the multiplier register is re-set to its home position.

8. An electric calculating system according to claim 7 comprising a separate contact-maker associated with each of the decimal digit-registering units of the multiplier register and arranged to automatically make contact when the registering unit in question is set to register a decimal digit, an interrupter, a separate connection from each of said contact-makers to said interrupter connecting said contact makers separately and alternately up in a resetting circuit comprising a current source, said interrupter, one of said connections and the appertenant separate contact maker, the said switch over contact when operated by the decimal point relay and the operating member of the column shifting devices belonging to the accumulator register and remotely controlled means for starting said interrupter simultaneously with the multiplication operation to produce pulses in said resetting circuit for resetting said column shifting device one step for each recording decimal digit in the multiplier register.

References Cited in the file of this patent

UNITED STATES PATENTS

| | | |
|---|---|---|
| 1,982,020 | Read | Nov. 27, 1934 |
| 1,982,722 | Zimmer | Dec. 4, 1934 |
| 2,131,497 | Borel | Sept. 27, 1938 |
| 2,178,950 | Bryce | Nov. 7, 1939 |
| 2,182,006 | Tauschek | Dec. 5, 1939 |
| 2,467,419 | Avery | Apr. 19, 1949 |